United States Patent Office 3,479,262
Patented Nov. 18, 1969

3,479,262
OLEFIN OXIDATION PROCESS
Alexander F. MacLean and Adin L. Stautzenberger, Corpus Christi, Tex., assignors to Celanese Corporation of America, New York, N.Y., a corporation of Delaware
No Drawing. Filed Jan. 3, 1966, Ser. No. 517,900
Int. Cl. B01k 1/00; C07b 3/00
U.S. Cl. 204—80          13 Claims

ABSTRACT OF THE DISCLOSURE

In a process for oxidizing an olefin to a carbonyl compound in the presence of a thallium salt, efficiency of the process is improved by combining the thallium salt with a noble metal and an oxidizing agent, especially a cerium salt, and by maintaining in the reactor two liquid phases, one aqueous and containing the catalyst and the other non-aqueous and containing the olefin. The carbonyl compound is recovered from the non-aqueous phase, which may contain an α,ω-dihaloalkane to improve extraction of the carbonyl compound from the aqueous reactor phase into the non-aqueous phase.

---

This invention relates to a process for the oxidation of olefins to aldehydes and ketones. More particularly, this process relates to a new and improved continuous process for the oxidation of olefinic hydrocarbons using thallium (III) salts.

In U.S. Patent No. 3,048,636, there is discussed a process for the oxidation of olefins by thallium (III). Glycols, aldehydes and ketones are obtained by this process. The process as described is not a continuous process, the yields obtained are fairly low, and there is no provision for the regeneration of thallium (I).

It has been found that ketones can be obtained from olefins very efficiently and in a continuous manner by continuous regeneration of the reduced thallium (I) to thallium (III).

It is an object of this invention to provide for the continuous oxidation of olefinically unsaturated hydrocarbons by contacting the olefin with an acidic solution comprising a thallium salt catalyst, a noble metal salt co-catalyst and an oxidizing agent having a formal oxidation potential of from about 1.3 to less than 1.5 volts.

It is a further object of this invention to provide a means of continuously reoxidizing Tl (I) to Tl (III) by an oxidizing agent having a formal oxidation potential of from about 1.3 to less than 1.5 volts in the presence of trace amounts of a noble metal salt, the oxidizing agent being continuously regenerated by electrochemical oxidation.

A still further object is the continuous regeneration of Tl (I) to Tl (III) by electrochemical oxidation.

The function of the oxidizing agent is to maintain thallium in its active oxidation state, thallium (III). The thallium (III) salt is reduced to a thallium (I) salt in the presence of an olefin and may be reoxidized to the thallium (III) state by an oxidizing agent having a formal oxidation potential of from about 1.3 to less than 1.5 volts. If the formal potential exceeds about 1.5 volts, side reactions reduce the efficiency of the desired reaction and if the oxidation potential of the oxidizing agent is less than about 1.3 volts the reaction becomes too slow. Oxidizing agents which have been found to be useful in the process according to this invention include cerium (IV) salts having formal oxidation potentials of 1.3 to less than 1.5 volts. Preferably cerium (IV) sulfate is used.

The reoxidation of thallium (I) to thallium (III) by the oxidizing agents discussed above is extremely slow.

It has been found that by the addition of a small amount of a noble metal salt, such as platinum, palladium, iridium, ruthenium, rhodium or osmium the oxidation of thallium (I) by the oxidizing agent proceeds rapidly. The noble metal salts are usually present as their water soluble salts in the reaction medium. Preferably the salts of ruthenium and iridium are used. The noble metal salt need only be present in a very small amount. As an indication of the function of the noble metal salt it was found that the oxidation of thallium (I) to thallium (III) by cerium (IV) had a half time at 100° C. of about 1000 hours. When ruthenium was added at a concentration $7 \times 10^{-6}$ molar as ruthenium chloride, the half time of the cerium-thallium reaction was only 1.3 minutes at 22° C.

The regeneration of the oxidizing agent used in the process according to this invention is carried out preferably by electrochemical oxidation. The regeneration may be carried out in situ or by a separate step. Cerium (III) can be electrochemically oxidized to give cerium (IV) using a divided or undivided electrochemical cell with suitable electrodes. In an undivided cell Ce (III) is oxidized at the anode which may be of platinum or other inert material such as graphite or lead, and hydrogen is produced at the cathode. The current is provided by any direct current source. The electrochemical oxidation of Ce (III) to Ce (IV) can be carried out at an anode current density ranging from $1 \times 10^{-3}$ to $1 \times 10^{-1}$ amps per sq. cm. and a temperature ranging from 10° C. to 85° C.

The overall reaction using cerium as the oxidizing agent and ruthenium as the noble metal catalyst is shown below:

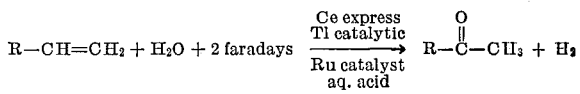

Chemical Reactions:

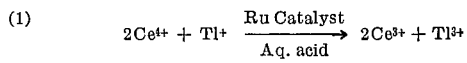

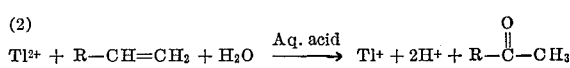

It has also been found that thallium (III) can be produced directly from thallium (I) at a high current efficiency is a divided electrolytic cell and this thallium (III) reacted with an olefin to yield a carbonylic product in a continuously operating process. It is necessary to use an electrochemical cell consisting of separate anodic and cathodic zones joined through a salt bridge or semipermeable membrane to avoid the deposition of thallium metal at the cathode. Thallium (I) may be regenerated in the reactor vessel, the vessel serving both as a reactor and a electrochemical cell, or the thallium (I) may be regenerated in a separate vessel. An anodic current density ranging from $1 \times 10^{-3}$ amps per sq. cm. is sufficient for most operations.

Substantially any olefin is operable in this invention provided that the olefins being oxidized have at least one hydrogen atom attached to each of the carbon atoms constituting the olefinic unsaturation. Examples of olefins useful in the process according to this invention include those having the formula R—CH=CH—$R_1$ wherein R and $R_1$ are radicals selected from the group consisting of hydrogen, alkyl, halogenated alkyl, phenyl, cycloalkyl, etc. Inclusive of the compounds which may be used are ethylene, propylene, butylene, isobutylene, octene, hexene and their substituted analogs such as styrene, halogenated propylene and butenes, the acyclic olefins such as cyclohexene, camphene, methene, and diolefins, such as butadiene and isoprene. The reaction conditions must be adapted to the compound used and to the physical properties of the compound used. The process according to this invention may be carried out under pressure when the normally gaseous olefins, such as ethylene or propylene, are used in order to increase their solubility in the reaction medium.

The process of this invention can be carried out at temperatures from 0 to 200° C., preferably 25° to 50° C. Atmospheric pressure, subatmospheric pressure or superatmospheric pressure may be employed, e.g. 0 to 1500 p.s.i., and preferably 0 to 700 p.s.i. pressure.

The process of this invention is preferably carried out in an aqueous solution but it may be carried out in an aqueous solution in which the water is diluted with a coupling solvent which is inert under the reaction conditions such as tetrahydrofurane, acetone, butyl alcohol, or acetonitrile. It is important that the process be carried out in an acidic medium. The preferred pH values are those between 2 and 0.

For stoichiometric reasons the molar ratio of olefin bond to thallium (III) must be at least 1. Higher ratios do not result in any particular advantage, although they may be used. The molar ratio of thallium to cerium (IV) is not particularly important as long as there is sufficient cerium (IV) present to reoxidize the thallium (I) to the higher oxidation state. As pointed out earlier the noble metal catalyst may be present only in trace amounts ranging from $1 \times 10^{-6}$ to $1 \times 10^{-2}$ molar.

The principal products of the oxidation of olefins in the presence of thallium (III) are ketones, though aldehydes may be formed under varying reaction conditions.

The process is preferably carried out in a continuous manner. The oxidizing agent and noble metal co-catalyst are fed into the reaction zone, the reaction zone containing the desired olefinic hydrocarbon and an aqueous solution of thallium catalyst. As the reaction takes place the organic liquid phase is removed from the reaction zone and continuously fed to a distillation column where the olefinic hydrocarbon is separated from the desired aldehyde or ketone product and recycled to the reaction zone. At the same time the aqueous phase containing the spent oxidizing agent is recycled to the electrochemical cell for regeneration. When regenerating the thallium catalyst directly by electrochemical oxidation, the regeneration may take place in the reaction vessel or in a separate vessel.

The reaction media, when using a liquid olefin, usually consists of two phases, aqueous and organic. Coupling solvents which are inert to the reactants under the conditions of the process can be used to increase the conversion rate of the olefin.

Organic extraction agents which effectively extract the desired carbonylic compound from the aqueous phase are useful in preventing further ionic attack of the catalyst on the carbonyl compound. Extracting agents such as the $\alpha,\omega$ dichloroalkanes have been found to be particularly useful in this regard. Inclusive of these compounds are 1,2-dichloroethane, 1,4-dichlorobutane and 1,6-dichlorohexane.

The following examples serve to illustrate the practice of this invention but it is intended that the invention not be limited to the specific compounds and reaction variables found in these examples.

Example I

Thallium (I) was oxidized to thallium (III) in a divided electrolytic cell having a porous cylindrical porcelain cup diaphragm surrounded by a platinum screen anode and a platinum cathode. The anolyte was 0.08 molar thallium (I) sulfate solution in 1 N sulfuric acid while the catholyte was a 1 N solution of sulfuric acid in 0.1 molar sodium sulfate. The anolyte was circulated by a magnetically coupled impeller. Total current was measured with a calibrated gas coulometer. Terminal voltage and anode potential vs. a standard calomel electrode were also measured. The temperature of the electrolytic cell was 25° C. The cell potential ranged from 3.3 to 4.9 volt while the anode current density was 2 amps per sq. cm. Thallium (III) was produced at the anode with hydrogen gas giving off at the cathode. The thallium (III) solution was fed into a stirred reactor containing 100 milliliters of octene-1 at a temperature of 60° C. The octanone formed was concentrated in the octene phase and this phase was fed to a 15 tray, ½" Oldershaw column where the ketone produced octanone-2, was taken off at the bottom of the column and the unreacted octene-1 recycled to the reactor. The aqueous catalyst solution from the reactor was recycled to the cell for regeneration. The current efficiency to octanone-2 was 69% based on Tl (III).

Example II

A 0.103 M thallic solution in 2 $NH_2SO_4$ was prepared electrolytically in a diaphragm cell as described in Example I. Using the thallic solution the following runs were made:

(1) Twenty ml. of 0.103 M Tl (III) in 2 N $H_2SO_4$ was agitated under an atmosphere of butene-2. After 20 minutes, no more butene-2 was absorbed indicating completion of the reaction. The reaction products were removed and analyzed. Methyl ethyl ketone was obtained at 97% efficiency based on Tl (III).

(2) The above run was repeated using butene-1. Methyl ethyl ketone was obtained at 89.5% efficiency based on Tl (III).

(3) A solution of 1,4-dichlorobutane was saturated with butene-2. Twenty ml. of 0.103 M Tl (III) in 2 N $H_2SO_4$ was added and the two-phase mixture agitated under an atmosphere of butene-2. In less than 20 minutes all of the Tl (III) was reduced giving methyl ethyl ketone at about 100% efficiency. The 1,4-dichlorobutane present in the reactor effectively extracted methyl ethyl ketone from water as it formed, preventing further ionic oxidation of the methyl ethyl ketone.

Example III

A divided electrochemical cell as described in Example I was used having an anolyte containing 87 ml. of a solution of 0.04 M tallium sulfate in 1 M perchloric acid and 87 ml. of a 1 M perchloric acid solution catholyte. Three millifaradays of current were passed through the solution at 25° C. The anode current density was $3 \times 10^{-3}$ amps per sq. cm. The cell voltage was about 3.4 volts. Thallium (III) was produced at a 99% current efficiency.

The thallium (III) prepared as above was fed into a stirred reactor along with octene and a solubilizer or coupling solvent. The results are shown in Table I.

TABLE I

| Octene phase, ml. | Percent Coupling solvent | Octanone efficiency based on Tl(III), percent |
|---|---|---|
| Aqueous phase, ml.: | | |
| 31 | 2 | 98 |
| 31 | 2   25% acetone | 58 |
| 31 | 2   25% butyl alcohol | 50 |
| 31 | 2   25% acetonitrile | 57 |

Example IV

A stirred electrolytic cell having an anode of platinum gauze and a cathode of platinum wire was used as the reactor. Eighty ml. of a 0.2 F cerium (III) solution in 1 N perchloric acid was added to the reactor-electrolytic cell. Ten millifaradays of electricity were passed through the cerium (III) solution oxidizing the Ce (III) to Ce (IV). Twenty ml. of octene-1 and sufficient Tl (I) as thallous sulfate (0.04 FTl (I)) were added to the reactor. A trace amount of ruthenium as $RuCl_3$ was present. Octanone-2 was obtained in good yields.

Example V

Ten ml. of a solution which comprised 0.10 M ceric sulfate, 0.01 M thallous sulfate, and $1 \times 10^{-4}$ M ruthenium trichloride, was shaken with 2 ml. of octene-1 at 25° C. On shaking the two-phase mixture, the aqueous phase became nearly colorless indicating colorless cerous formation. Iodometric analysis of the aqueous phase showed practically all of the ceric ion to be absent. Gas chromatographic analysis of the octene phase showed that octanone-2 was the major product with a small amount of octanone-3 and octanone-4 present. Octanone was obtained at 94% efficiency based on Ce (IV).

In a similar run carried out at 50° C., the efficiency to octanone was 90% based on Ce (IV).

Example VI

A continuous electrochemical process was carried out using a separate reactor and electrolytic cell. Through an aqueous electrolyte solution 1.0 N in $H_2SO_4$, and containing 0.5 FCe (III), 0.05 FTl (I) and $1 \times 10^{-5}$ FRu (III), present in an undivided electrochemical cell having a platinum wire cathode and platinum gauze anode, 500 ma., or 40.4 millifaradays of current was passed. The anode current density was $0.5 \times 10^{-2}$ amps per sq. cm. and the cell potential ranged from 3.5 to 4.5 volts. The temperature of the cell was 15° C. In the cell Ce (III) was oxidized to Ce (IV) at the anode and hydrogen was given off at the cathode. The aqueous electrolyte solution was continuously fed into a stirred reactor containing 80 ml. of octene-1, the reactor temperature being 60° C. Octene-1 was oxidized by Tl (III) in the reactor to octanone. The organic phase containing octene-1 and octanone was continuously removed from the reaction zone and fed into a 15 tray, ½″ Oldershaw column. Octanone concentrated in the reboiler of the column, and octene-1 was removed overhead and recycled back to the reactor. At the same time the aqueous phase containing spent thallium catalyst as Tl (I) was recycled to the electrochemical cell for regeneration. The total aqueous inventory was 280 ml. The current efficiency to octanone was 67% based on Ce (IV).

Example VII

A solution of 20 ml. of 0.061 N Ce $(SO_4)_2$ in 2 N $H_2SO_4$, 0.5 ml. of 0.05 M $Tl_2SO_4$ in 2 N $H_2SO_4$ and 0.04 mg. $RuCl_3$ was agitated in contact with 1 atmosphere of butene-1 at 25° C. until the Ce (IV) had completely reacted, approximately 25 minutes. Methyl ethyl ketone was obtained. The efficiency to methyl ethyl ketone based on Ce (IV) was 47%.

Until similar conditions butene-2 was reacted giving methyl ethyl ketone at about the same efficiency.

Diolefins may also used. For example, butadiene-1,3 yielded methyl vinyl ketone. Isoprene gave methyl isopropenyl ketone.

The embodiments of the invention in which an exclusive property or privilege is claimed are defined as follows:

1. In a process for oxidizing an olefinic hydrocarbon to a carbonyl compound selected from the group consisting of ketones and aldehydes by contacting said olefinic hydrocarbon in a reaction zone with an acidic catalyst solution of a thallium salt, the improvement which comprises:

(a) maintaining in said reaction zone two liquid phases, one being an oil phase in which said carbonyl compound is soluble and which comprises said olefinic hydrocarbon and the other being an aqueous phase comprising said catalyst solution;

(b) incorporating in said catalyst solution a noble metal salt and an oxidizing agent having a formal oxidation of about 1.3 to less than 1.5 volts whereby the thallium is maintained in its active oxidation state; and (c) withdrawing said oil phase from said reaction zone and recovering said carbonyl compound therefrom.

2. Process according to claim 1 wherein the oxidizing agent is a cerium salt.

3. Process according to claim 2 wherein the oxidizing agent is cerium sulfate.

4. Process according to claim 3 wherein the process is carried out at a temperature ranging from 0 to 200° C.

5. Process according to claim 4 wherein the catalyst solution has a pH ranging from about 2 to 0.

6. Process according to claim 5 wherein the noble salt is ruthenium.

7. Process according to claim 1 wherein the oil phase is removed from the reaction zone, subjected to distillation to remove the carbonyl compound therefrom, and recycled to the reaction zone.

8. Process according to claim 1 wherein an α,ω dihaloalkane in which said carbonyl compound is soluble is incorporated in said oil phase.

9. Process according to claim 2 wherein the oxidizing agent is regenerated by electrochemical oxidation.

10. Process according to claim 9 wherein the electrochemical oxidation is carried out in situ.

11. Process according to claim 9 wherein the electrochemical oxidation is carried out in a separate zone.

12. Process according to claim 9 wherein the electrochemical oxidation is carried out in an undivided cell having an anode current density ranging from about $1 \times 10^{-3}$ to $1 \times 10^{-1}$ amps per sq. cm. at a temperature ranging from 10° C. to 85° C.

13. In a continuous process for the oxidation of an olefinic hydrocarbon to a carbonyl compound selected from the group consisting of ketones and aldehydes by contacting said olefinic hydrocarbon with an acidic solution of a thallium salt, the improvement which comprises continuously regenerating the thallium salt, as it is reduced, by electrochemical oxidation in a divided electrolytic cell at an anode current density ranging from $1 \times 10^{-3}$ to $1 \times 10^{-1}$ amperes per square centimeter and at a temperature ranging from 10° C. to 85° C.

References Cited
UNITED STATES PATENTS

| | | | |
|---|---|---|---|
| 3,048,636 | 8/1962 | Grinstead | 260—586 |
| 3,080,425 | 3/1963 | Smidt et al. | 260—586 |
| 3,087,968 | 4/1963 | Hörnig et al. | 260—604 |
| 3,106,579 | 10/1963 | Hörnig et al. | 260—586 |
| 3,122,586 | 2/1964 | Berndt et al. | 260—586 |
| 3,147,203 | 9/1964 | Klass | 204—80 |
| 3,154,586 | 10/1964 | Bander et al. | 260—597 |
| 3,303,020 | 2/1967 | Clement et al. | 75—83 |

JOHN H. MACK, Primary Examiner

H. M. FLOURNOY, Assistant Examiner

U.S. Cl. X.R.

260—587, 597

UNITED STATES PATENT OFFICE
CERTIFICATE OF CORRECTION

Patent No. 3,479,262            November 18, 1969

Alexander F. MacLean et al.

It is certified that error appears in the above identified patent and that said Letters Patent are hereby corrected as shown below:

Column 2, the first term of Equation (2), line 42, "$Tl^{2+}$" should read -- $Tl^{3+}$ --; same column, line 46, "is a divided" should read -- in a divided --. Column 4, TABLE I, "Aqueous phase, ml:", which has been printed below the horizontal line at line 59, should be moved to a position above the horizontal line and without the colon.

Signed and sealed this 15th day of December 1970.

(SEAL)

Attest:

Edward M. Fletcher, Jr.

Attesting Officer

WILLIAM E. SCHUYLER, JR.

Commissioner of Patents